(12) United States Patent
Saewert et al.

(10) Patent No.: US 6,393,293 B1
(45) Date of Patent: May 21, 2002

(54) METHOD FOR RECTANGULAR PARAMETERIZATION OF A GEOGRAPHIC AREA USING A GEOLOCATION ALGORITHM

(75) Inventors: David Stephen Saewert, Mesa; David Jesus Garcia, Chandler; James Morris Tooker, Chandler; Jerry Shihkuo Tang, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/489,393

(22) Filed: Jan. 21, 2000

(51) Int. Cl.[7] .................................................. H04Q 7/20
(52) U.S. Cl. ...................... 455/456; 455/457; 455/12.1; 455/427; 342/357.16
(58) Field of Search ................................ 455/456, 457, 455/12.1, 427, 429; 342/357.16, 352, 353

(56) References Cited

U.S. PATENT DOCUMENTS

| | | | | |
|---|---|---|---|---|
| 5,508,707 A | * | 4/1996 | LeBlanc et al. | 342/457 |
| 5,629,707 A | | 5/1997 | Heuvel et al. | 342/357 |
| 5,737,731 A | | 4/1998 | Lester et al. | 707/1 |
| 5,809,396 A | | 9/1998 | Armbruster et al. | 455/12.1 |
| 5,812,932 A | * | 9/1998 | Wiedeman | 455/13.1 |
| RE35,916 E | * | 10/1998 | Dennison et al. | 455/456 |
| 6,198,930 B1 | * | 3/2001 | Schipper | 455/440 |

* cited by examiner

*Primary Examiner*—Daniel Hunter
*Assistant Examiner*—Lana Le
(74) *Attorney, Agent, or Firm*—Ingrassia, Fisher & Lorenz

(57) ABSTRACT

A method (40) for parameterizing a predetermined geographic area (12) serviced by a satellite communication system (60) into a number of equally shaped sub-partitions (22) is discloseed. The satellite communication system (60) has a processor (64, 72) for generating data elements and a memory (66, 74) for storing the data elements in data structure. The method (40) includes the step (42) of determining a total latitude side length dimension and a total longitude side length dimension of the predetermined geographic area (12) from latitude and longitude values representative of the geographic area. The steps (44) also include determining the area of a sub-partition based upon the total latitude side length, the total longitude side length, and the number of equally shaped sub-partitions. Each of the sub-partitions (22) are substantially square and have the same area. The steps also include determining (50) an actual side latitude dimension (26) of the sub-partition (22) and storing the side latitude dimension (26) in the data structure, and determining (52) an actual side longitude dimension (28) of the sub-partition (22) and storing the side longitude dimension (26) in the data structure. The satellite communication system (60) generates a grid from the actual side latitude dimension (26) and the actual side longitude dimension (28) and superimposes the grid over the predetermined geographic area (12).

21 Claims, 1 Drawing Sheet

METHOD FOR RECTANGULAR PARAMETERIZATION OF A GEOGRAPHIC AREA USING A GEOLOCATION ALGORITHM

BACKGROUND OF THE INVENTION

1. Technical Field

The present invention relates generally to a method for parameterizing a geographical area. More particularly, the present invention is directed to a method for calculating rectangular parameterization of an arbitrarily shaped geographic area for use by a satellite based communication system.

2. Discussion

The overall control system portion of cellular, satellite, or other radio telecommunication networks often tracks the locations of the mobile subscriber units for which communication services are to be provided. The system activates a ring signal to alert a particular mobile unit to an incoming call. System resources can be conserved by activating the ring signal in only the illumination area where the mobile unit is located. In particular, the overall power consumed by the system in transmitting a ring signal is reduced when the ring signal is activated in fewer cells or geolocations. This power consumption problem becomes particularly important in a satellite-based network where one satellite may cover a very large geographic region. In addition, the number of incoming call or page alert messages that can be delivered using a given ring signal delivery capacity is increased when each ring signal is activated in fewer cells or geolocations.

Accordingly, the telecommunication network benefits from maintaining current, accurate and precise geolocation data for each mobile unit to which communication services are being provided. This type of geolocation data thus allows the system to more efficiently focus the ring signal coverage on a minimum area. With this type of geolocation data, the system can achieve the maximum conservation of system power and ring signal capacity resources while still achieving a good probability that the narrowly focused ring signal would be received by its intended mobile unit. This type of geolocation data also allows for increased billing accuracy, enhanced 911 and other emergency type services, as well as navigation type services via the telecommunications network.

However, in present satellite-based networks other system resources are consumed for maintaining current, accurate and precise location data for each mobile unit. In particular, an undesirably large amount of overhead communications is required for tracking the location of each mobile unit. To maintain current location data, the system might engage in a communication session with a mobile unit each time a mobile unit moves a small distance from the last location recorded by the system. Unfortunately, for a given amount of spectrum allocated to the network, these overhead communication sessions would prevent the network from conveying a corresponding amount of subscriber traffic. In other words, the network benefits from minimizing the number of such overhead communication sessions because minimizing overhead communication sessions maximizes the system capacity available for conveying subscriber traffic. But, minimizing the number of overhead communication sessions reduces the system's ability to accurately and precisely track mobile unit locations.

Accordingly, network resources are optimally conserved by balancing ring signal illumination area against overhead traffic communication volume. Unfortunately, conventional radio telecommunication networks strike a very crude balance between illumination area and overhead traffic communication volume. As a consequence, power consumption is undesirably high in many situations, and an undesirably high proportion of the allocated spectrum is used for overhead communication sessions in other situations.

In particular, conventional mobile units register with their system in accordance with a temporal re-registration schedule. Using a temporal schedule, slow moving mobile units waste precious overhead traffic capacity by informing the system of mobile unit locations that are little changed from previous locations. Conversely, a frequent call-in schedule must be adopted to accommodate fast moving mobile units, or else the fast moving mobile units are likely to move so far from known locations that ring signals activated in a limited area will not be received.

Other know types of mobile units register with their systems when they move out of a predetermined area. This technique improves upon temporal re-registration, but still fails to adequately compensate for differences between various types of mobile unit equipment and mobile unit users. For example, an optimum balance of illumination area against overhead traffic communications for faster moving mobile units is likely to differ from an optimum balance for slower moving or stationary mobile units. When a single illumination area is used for all proximately located mobile units, the illumination area is likely to be undesirably large for slower mobile units and undesirably small for faster moving mobile units. Thus, too much power is consumed is ringing slower mobile units and too much overhead traffic communication is required to track faster moving mobile units.

Moreover, conventional prior art networks fail to adequately consider different user needs in configuring ring signals. For communication services to meet user expectations, all mobile units need to have a good probability of receiving ring signals activated in the areas where they reside. While this good probability of receiving a ring signal is adequate for most users, certain VIP users and emergency service providers may need a higher probability of receiving their ring signals. The power consumption and equipment costs associated with improving this good probability to an excellent probability for all users are disproportionately high. Thus, conventional networks force all mobile unit users, including those involved in providing emergency services and VIP users, to experience the same good probability of receiving incoming calls as is provided for all other users.

In view of the above it is desirable to provide a method for reducing the amount of overhead required for geolocating a mobile unit. It is further desirable to provide a method for calculating and assigning location area codes for a predetermined geographic area. Finally it is desirable to provide a technique and method for efficiently optimizing the partitioning of a geographic area into sub-partitions.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figure 1:
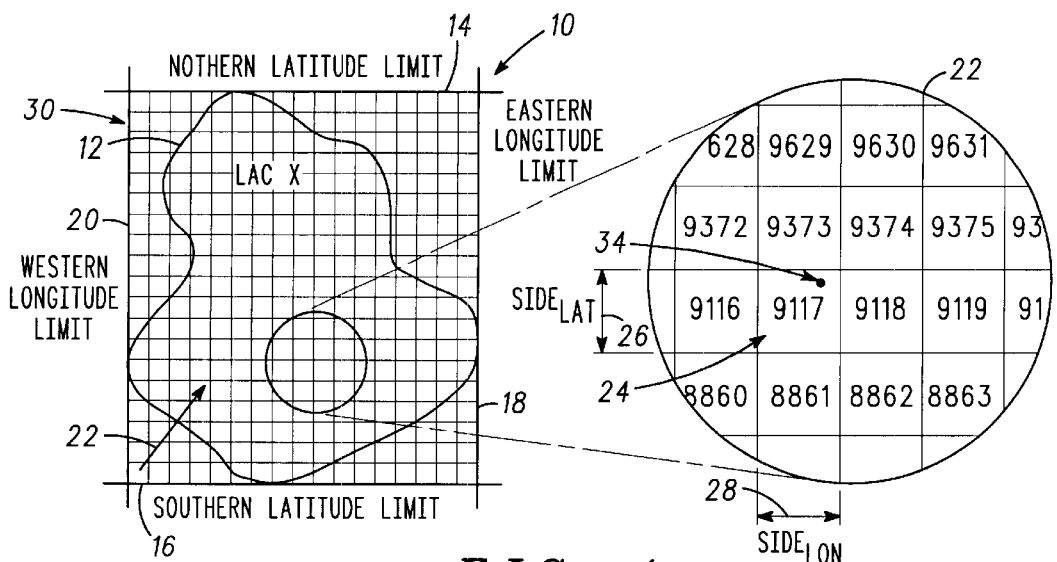
FIG. 1 is a diagram showing the partitioning of a geographic area identified by a location area code (LAC) into sub-partitions in accordance with a preferred embodiment of the present invention.

Referring now to FIG. 1, the parameterization scheme for a location area code (LAC) region 10 is shown in accordance with a preferred embodiment of the present invention. More specifically, FIG. 1 discloses the technique for LAC region partitioning for an irregularly or arbitrarily shaped geographic area 12. As will be appreciated, geographic area 12 may include one or more countries, or may include political subdivisions within a particular country.

The earth's surface is divided up into LAC regions such as LAC region 10. A LAC region can follow geopolitical boundaries such as state or country borders, or can be arbitrary such as dividing up large regions of ocean across the globe. There are no requirements on LAC region size or geometric shape. As such, the LAC region can be as regularly shaped or irregularly shaped as desired. In the targeted satellite communication system, geolocation computations are quantized to the LAC region 10. Since there are no constraints on LAC regions, a substantial amount of satellite vehicle beams may need to be utilized for delivering a ring alert message or signal to a subscriber unit contained within a large LAC region 10. Parameterization of the area within the LAC regions provides a mechanism by which satellite resources can be utilized in an efficient matter by limiting the region to be illuminated by satellite communication beams.

Also shown in FIG. 1 is that the LAC region 10 is further subdivided into a plurality of sub-partitions 22. As part of the algorithm, each LAC region 10 will include n discrete sub-partitions 22. The value for n is a user-defined parameter where n is preferably chosen to be a relatively large number. As part of the present application, n=$2^{14}$−1 or 16,383. However, n can be chosen to be higher or lower. As will be appreciated, this forces the area (or dimensions) of each sub-partition 22 to remain relatively small. The size of the LAC region 10 does not effect how many sub-partition divisions will be made. However, as part of the present invention, a larger LAC region will contain larger sub-partitions assuming n is constant for all LAC regions.

The geographic area 12, as with any arbitrarily shaped geographic area, will include a northern latitude limit 14, a southern latitude limit 16, an eastern longitude limit 18 and a western longitude limit 20. Accordingly, these latitude and longitude limits numerically define a rectangular area 30. The technique associated with the present invention then involves a method for subdividing the rectangular area 30 into the plurality of sub-partitions 22. The steps for implementing this method are described in greater detail below.

With continued reference to FIG. 1, the details associated with the plurality of sub-partitions 22 is shown. More specifically, sub-partition 24 includes a side latitude dimension 26 (in degrees latitude) and a side longitude dimension 28 (in degrees longitude). Preferably, sub-partition 24 is at least rectangular, and more preferably approximates a square. Also, the algorithm forces the plurality of sub-partitions 22 to be the same size. Thus, it is preferred that all of the side latitude dimensions 26 and the side longitude dimensions 28 are substantially equal. Sub-partition 24 is shown associated with identification number 9117, which is a unique number within the LAC region 10 for identifying the sub-partition 24. A subscriber unit 34 is located within sub-partition 24. Accordingly, the subscriber unit 34 can be tracked by LAC region number and sub-partition number. Preferably, the LAC region number and sub-partition number are stored within a data structure forming part of the communication system. This technique saves memory and processing time because of the small amount of memory required to store the LAC region number sub-partition number. The exact location of the subscriber unit 34, in terms of latitude and longitude, can be found by indexing the sub-partition number with latitude and longitude values stored in a separate database, and then performing a look-up function. Additionally, the resulting grid of sub-partitions 22 can be overlaid onto the particular geographic area 12 as part of a separate computer implemented process.

Figure 2:
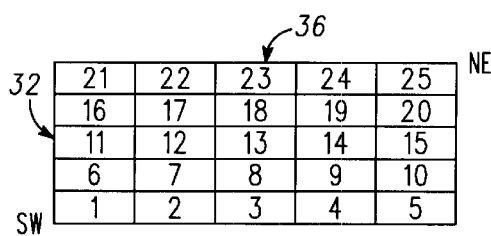
FIG. 2 is a diagram showing the sub-partition numbering scheme utilized within each location area code.

Turning now to FIG. 2, the numbering scheme for the plurality of sub-partitions 22 is disclosed. More specifically, FIG. 2 shows an exemplary rectangular area 32 subdivided into 25 sub-partitions 36. After the sub-partition dimensions are calculated, the sub-partitions are sequentially numbered using whole integers which preferably start at one (1) and increase up to n, where exemplary rectangular area 32 has n=25 partitions. These values are also preferably stored within a data structure forming part of the communication system. The value of zero (0) is reserved to refer to the entire, undivided LAC region should this be desirable or necessary for identification purposes. The partition numbers increase sequentially from left to right, and also increase from bottom to top. More precisely, these numbers increase from a southwest direction to a northeast direction. One skilled in the art will appreciate that this numbering scheme coincides with the latitude and a longitude numerical scheme, where longitude increases from west to east, and latitude increases from south to north.

Figure 3:
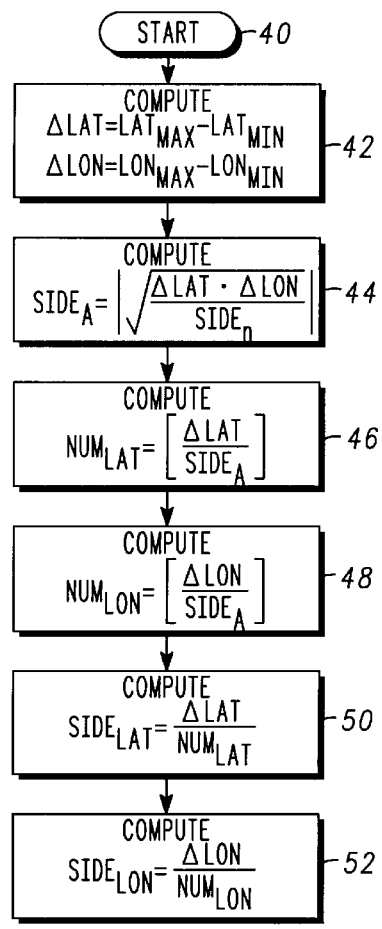
FIG. 3 is a flow diagram showing the steps for calculating the side latitude and side longitude dimensions of each sub partition within the location area code.

Referring now to FIG. 3, a flow chart discloses the algorithm 40 used to parameterize the LAC region 10. As discussed above, the LAC region parameterization algorithm 40 attempts to subdivide the rectangular area 30 defined by the latitude and longitude limits 14, 16, 18, 20 into n discrete sub-partitions 22. Accordingly, the algorithm generates a data structure representing a grid of approximated squares which can be superimposed over the LAC region 10 by a geolocation computer forming part of the satellite communication system.

Figure 4:
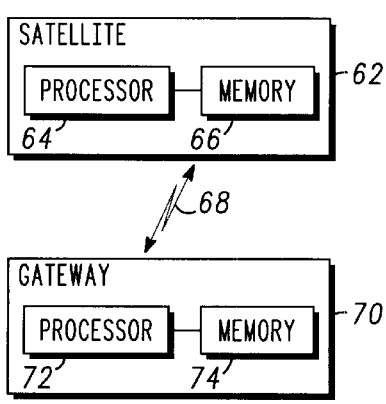
FIG. 4 is a block diagram showing the processor and memory architecture of the communication system for processing the data structure associated with the parameterization technique of the present invention.

Turning briefly to FIG. 4, the architecture of the geolocation computer 60 is shown. More specifically, the geolocation computer 60 preferably includes a processor 64 and memory 66 within the satellite 62, and a processor 72 and a memory 74 within the gateway 70. The algorithm 40 is preferably implemented by the processor 72 within the gateway 70 so that the elements forming the parameterization data structure can be stored in the memory 74. When necessary, the elements within the parameterization data structure can then be transmitted to the satellite 62 via communication link 68. Alternatively, algorithm 40 can be implemented by a processor 64 within the satellite 62 and the resulting parameterization data structure stored in the memory 66. In this configuration, these elements can then be transmitted to the gateway 70 via the communication link 68.

Referring back to FIG. 3, and specifically to block 42, the minimum and maximum latitude and longitude values 14, 16, 18, 20 are first obtained by the geolocation computer 60 and used to compute the latitude and longitude side lengths of the LAC region 10 (Δlat and Δlon). These values are then stored in memory 66 or 74 as part of the parameterization data structure. At block 44 the side length (side$_a$) of the square sub-partitions 22 is then computed based upon the product of the latitude and longitude side lengths (in degrees squared) and divided by the number (n) of sub-partitions 22. This computation produces the area of each sub-partition in degrees squared units. Taking the positive square root of this area value produces side$_a$ which is the side length dimension (in degrees) of each sub-partition 22. This value is also stored in memory 66, 74 as part of the data structure. At blocks 46 and 48 the number of discrete latitude and longitude values (num$_{lat}$, num$_{lon}$) are then computed by dividing the latitude span ($\Delta$lat) and longitude span ($\Delta$lon) by the side length dimension side$_a$ of the square sub-partition 22. The results of the num$_{lat}$ and num$_{lon}$ calculations are then truncated to the nearest whole number using a floor operation. At blocks 50 and 52 these truncated values for num$_{lat}$ and num$_{lon}$ are then used to compute the actual side latitude 26 and side longitude 28 dimensions side$_{lat}$ and side$_{lon}$ respectively (in degrees) for the sub-partitions 22 by taking the appropriate span ($\Delta$lat, $\Delta$lon) and dividing by the truncated factors (num$_{lat}$, num$_{lon}$). These results also form data elements in the parameterization data structure stored in memory 66 or 74, and can be used for representing the grid of approximated squares which can then be superimposed over the LAC region 10 by the geolocation computer.

As will be appreciated, the algorithm and method of the present invention are used to parameterize a LAC region into smaller rectangular and preferably square regions, which in turn allows for greater geolocation accuracy within a LAC region 10. The algorithm of the present invention imposes no geometric constraints with regard to a LAC region's geometric shape.

The algorithm 40 of the present invention provides substantial computational efficiency because the total number of calculations is small, the most complex computation is a simple square root calculation, and the parameterization data structure is relatively small because it contains only a few data elements as opposed to specific latitude and longitude data points. As can be appreciated, this allows increased location accuracy computations for the communication gateway. This increase in location accuracy thus translates into the following benefits: maximizing satellite constellation ring alert capacity and efficiency; increasing location determination accuracy (which is vital for emergency calling and billing accuracy); and reducing the size and complexity of the LAC region parameterization of the earth. Finally, the present invention proposes an alternate approach to LAC region parameterization which is compatible with existing communication system resources and communication gateways, provides improved geolocation accuracy, and achieves higher processing efficiency.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for parameterizing a predetermined geographic area serviced by a satellite communication system into a number of equally shaped sub-partitions, said satellite communication system having a processor for generating data elements and a memory for storing the data elements in a parameterization data structure, said method comprising:

obtaining latitude and longitude values representative of the predetermined geographic area;

determining a total latitude side length dimension and a total longitude side length dimension of the predetermined geographic area from the latitude and longitude values;

determining the area of a sub-partition based upon the total latitude side length, the total longitude side length, and the number of equally shaped sub-partitions;

determining a side length dimension of the sub-partition based upon the area of the sub-partition;

determining a number of rows of sub-partitions within the geographic area;

determining a number of columns of sub-partitions within the geographic area;

determining an actual side latitude dimension of the sub-partition and storing the side latitude dimension in the data structure; and determining an actual side longitude dimension of the sub-partition and storing the side longitude dimension in the data structure.

2. The method of claim 1 wherein the satellite communication system generates a grid from the actual side latitude dimension and the actual side longitude dimension and superimposes the grid over the predetermined geographic area.

3. The method of claim 1 wherein the sub-partitions are substantially square.

4. The method of claim 1 wherein a total number of sub-partitions is independent of a size of the predetermined geographic area.

5. The method of claim 4 wherein the area of the sub-partition is determined by multiplying the total latitude side length and the total longitude side length and dividing by the total number of sub-partitions.

6. The method of claim 1 wherein the step of determining the number of rows of sub-partitions further includes taking the total latitude side length and dividing by the side length dimension of the sub-partition.

7. The method of claim 1 wherein the step of determining the number of columns of sub-partitions further includes taking the total longitude side length and dividing by the side length dimension of the sub-partition.

8. The method of claim 1 wherein the step of determining the actual side latitude dimension further includes dividing the total latitude side length by the number of rows.

9. The method of claim 1 wherein the step of determining the actual side longitude dimension further includes dividing the total longitude side length by the number of columns.

10. The method of claim 1 wherein the side length dimension of the sub-partition is determined by taking the positive square root of the area of the sub-partition.

11. The method of claim 1 wherein each sub-partition is uniquely represented by a sub-partition number.

12. The method of claim 11 wherein the first sub-partition number is given the value of one.

13. The method of claim 12 wherein the value of zero for the sub-partition number is representative of the aggregation of all of the sub-partitions within the predetermined geographic area.

14. The method of claim 11 wherein the sub-partition numbers increase by whole integers.

15. The method of claim 11 wherein the sub-partition number increase from a southwest direction toward a northeast direction.

16. The method of claim 11 wherein the sub-partition number is used to track the location of a subscriber unit within the predetermined geographic area.

17. A method for parameterizing a predetermined geographic area serviced by a satellite communication system into a number of equally shaped sub-partitions, the satellite communication system including a satellite and a gateway, one of the satellite and the gateway having a processor for generating data elements and a memory for storing the data elements in a data structure, said method comprising:

obtaining latitude and longitude values representative of the predetermined geographic area;

determining a total latitude side length dimension and a total longitude side length dimension of the predetermined geographic area from the latitude and longitude values;

determining the area of a sub-partition based upon the total latitude side length, the total longitude side length, and the number of equally shaped sub-partitions, each of the sub-partitions being substantially square and having the same area;

determining a side length dimension of the sub-partition based upon the area of the sub-partition;

determining a number of rows of sub-partitions within the geographic area;

determining a number of columns of sub-partitions within the geographic area;

determining an actual side latitude dimension of the sub-partition and storing the side latitude dimension as a first data element in the data structure; and determining an actual side longitude dimension of the sub-partition and storing the side longitude dimension as a second data element in the data structure;

wherein the satellite communication system generates a grid from the actual side latitude dimension and the actual side longitude dimension and superimposes the grid over the predetermined geographic area.

18. The method of claim 17 further including the step of generating a parameterization data structure having geolocation data elements and storing the data structure in the memory.

19. The method of claim 18 wherein the step of generating the parameterization data structure is performed by the processor within the gateway and the data structure is stored in the memory within the gateway.

20. The method of claim 18 wherein the step of generating the parameterization data structure is performed by the processor within the satellite and the data structure is stored in the memory within the satellite.

21. A method for parameterizing a predetermined geographic area serviced by a satellite communication system into a number of equally shaped sub-partitions, said satellite communication system having a processor for generating data elements and a memory for storing the data elements in a parameterization data structure, said method comprising:

determining a total latitude side length dimension and a total longitude side length dimension of the predetermined geographic area from latitude and longitude values representative of the geographic area;

determining the area of a sub-partition based upon the total latitude side length, the total longitude side length, and the number of equally shaped sub-partitions, each of the sub-partitions being substantially square and having about the same area;

determining an actual side latitude dimension of the sub-partition and storing the side latitude dimension in the data structure; and determining an actual side longitude dimension of the sub-partition and storing the side longitude dimension in the data structure;

wherein the satellite communication system generates a grid from the actual side latitude dimension and the actual side longitude dimension and superimposes the grid over the predetermined geographic area.

\* \* \* \* \*